(12) United States Patent
Bobritsky

(10) Patent No.: US 10,230,757 B2
(45) Date of Patent: Mar. 12, 2019

(54) METHOD AND SYSTEM FOR HANDLING MALWARE

(71) Applicant: Minerva Labs Ltd., Petach-Tikva (IL)

(72) Inventor: Eduard Bobritsky, Yahud-Monosson (IL)

(73) Assignee: Minerva Labs Ltd., Petach-Tikva (IL)

( * ) Notice: Subject to any disclaimer, the term of this patent is extended or adjusted under 35 U.S.C. 154(b) by 0 days.

(21) Appl. No.: 14/914,040

(22) PCT Filed: Aug. 27, 2014

(86) PCT No.: PCT/IL2014/050775
§ 371 (c)(1),
(2) Date: Feb. 24, 2016

(87) PCT Pub. No.: WO2015/029037
PCT Pub. Date: Mar. 5, 2015

(65) Prior Publication Data
US 2016/0212154 A1 Jul. 21, 2016

Related U.S. Application Data

(60) Provisional application No. 61/870,271, filed on Aug. 27, 2013.

(51) Int. Cl.
*H04L 29/06* (2006.01)
*G06F 21/56* (2013.01)
(52) U.S. Cl.
CPC ............ *H04L 63/145* (2013.01); *G06F 21/56* (2013.01); *H04L 63/1416* (2013.01); *G06F 2221/2127* (2013.01); *H04L 63/1491* (2013.01)

(58) Field of Classification Search
CPC ............... H04L 63/145; H04L 63/1416; H04L 63/1491; G06F 21/56; G06F 2221/2127
See application file for complete search history.

(56) References Cited

U.S. PATENT DOCUMENTS

| 8,332,946 | B1 | 12/2012 | Boisjolie et al. |
| 8,365,297 | B1 * | 1/2013 | Parshin ................. G06F 21/575 713/2 |
| 8,667,581 | B2 | 3/2014 | Steeves et al. |
| 8,763,125 | B1 | 6/2014 | Feng |
| 2004/0128529 | A1 * | 7/2004 | Blake ................. H04L 63/1491 726/25 |
| 2004/0162994 | A1 * | 8/2004 | Cohen ................. H04L 63/1491 726/22 |
| 2010/0031353 | A1 | 2/2010 | Thomas et al. |

(Continued)

FOREIGN PATENT DOCUMENTS

WO WO 2015/029037 3/2015

OTHER PUBLICATIONS

Vishnani et al, Detecting & Defeating Split Personality Malware, Dec. 2011, IARIA, 7 Pages.*

(Continued)

*Primary Examiner* — Christopher C Harris

(57) ABSTRACT

Systems, methods, and software products prevent malware attacks on networks, which include endpoint devices, by providing an environment to the endpoint device which simulates an environment, for example, a security environment, where malware is known to refrain from executing.

14 Claims, 11 Drawing Sheets

(56) References Cited

U.S. PATENT DOCUMENTS

| | | | |
|---|---|---|---|
| 2010/0306850 A1* | 12/2010 | Barile | G06F 21/577 |
| | | | 726/25 |
| 2011/0023084 A1 | 1/2011 | Kraemer | |
| 2011/0167494 A1* | 7/2011 | Bowen | G06F 21/566 |
| | | | 726/24 |
| 2011/0219450 A1 | 9/2011 | McDougal et al. | |
| 2011/0225655 A1* | 9/2011 | Niemela | G06F 21/566 |
| | | | 726/24 |
| 2013/0145465 A1* | 6/2013 | Wang | G06F 21/552 |
| | | | 726/23 |
| 2013/0191924 A1 | 7/2013 | Tedesco et al. | |
| 2013/0275945 A1* | 10/2013 | Kollberg | G06F 9/45558 |
| | | | 717/124 |
| 2016/0259939 A1 | 9/2016 | Bobritsky | |
| 2018/0121654 A1 | 5/2018 | Bobritsky et al. | |

OTHER PUBLICATIONS

Fovino et al, An experimental investigation of malware attacks on SCADA systems, Oct. 5, 2009, Elsevier, 7 Pages.*
International Preliminary Report on Patentability dated Mar. 10, 2016 From the International Bureau of WIPO Re. Application No. PCT/IL2014/050775.
International Search Report and Written Opinion dated Mar. 2, 2015 From the International Searching Authority Re. Application No. PCT/IL2014/050775.
Restriction Official Action dated Apr. 19, 2017 From the US Patent and Trademark Office Re. U.S. Appl. No. 14/639,191. (7 Pages).
Notice of Allowance dated Aug. 16, 2017 From the US Patent and Trademark Office Re. U.S. Appl. No. 14/639,191. (16 pages).

* cited by examiner

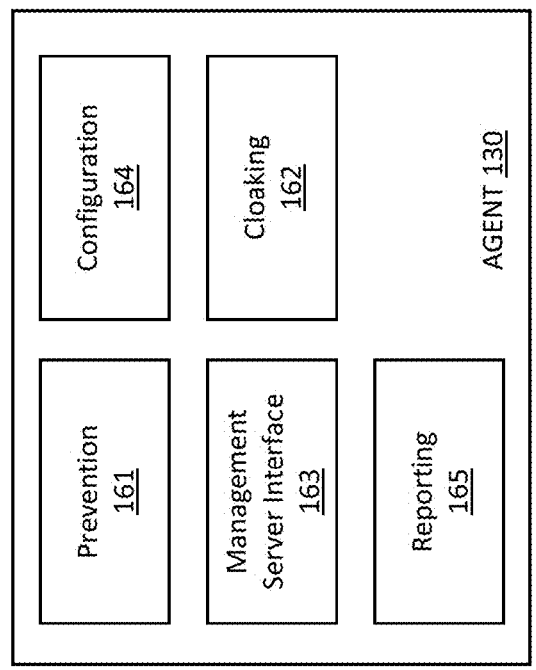

FIG. 7

```
unsigned int v191; // [sp+970h] [bp-4h]@1 v191 = (unsigned int)&v162 < dword_40D004;
If ( sub_401870(L"VBOXTRAY.EXE")
    || sub_401870(L"VBOXSERVICE.EXE")
    || sub_401870(L"VMWAREUSER.EXE")
    || sub_401870(L"VMWARYTRAY.EXE")
    || sub_401870(L"VMUPGRADEHELPER.EXE")
    || sub_401870(L"VMTOOLS.EXE")
    || sub_401870(L"VMACTHLP.EXE")
    || !_access("C:\\Program Files\\Vmware\\Vmware Tools\\VMwareUser.exe", 0)
    || !_access("C:\\Program Files\\Vmware\\Vmware Tools\\VMwareTray.exe", 0) )
{
    memset((void *)&CmdLine[1], 0 , 0x1FFu);
    memcpy((void *)CmdLine, "C:\\Program Files\\Internet Explorer\\iexplore.exe ", 0x30u);
    CmdLine[48] = aCProgramFilesI[48];
    v157 = &v184;
    do
    {
        v158 = *((_BYTE *)v157 + 1);
        wWinMain:192
```

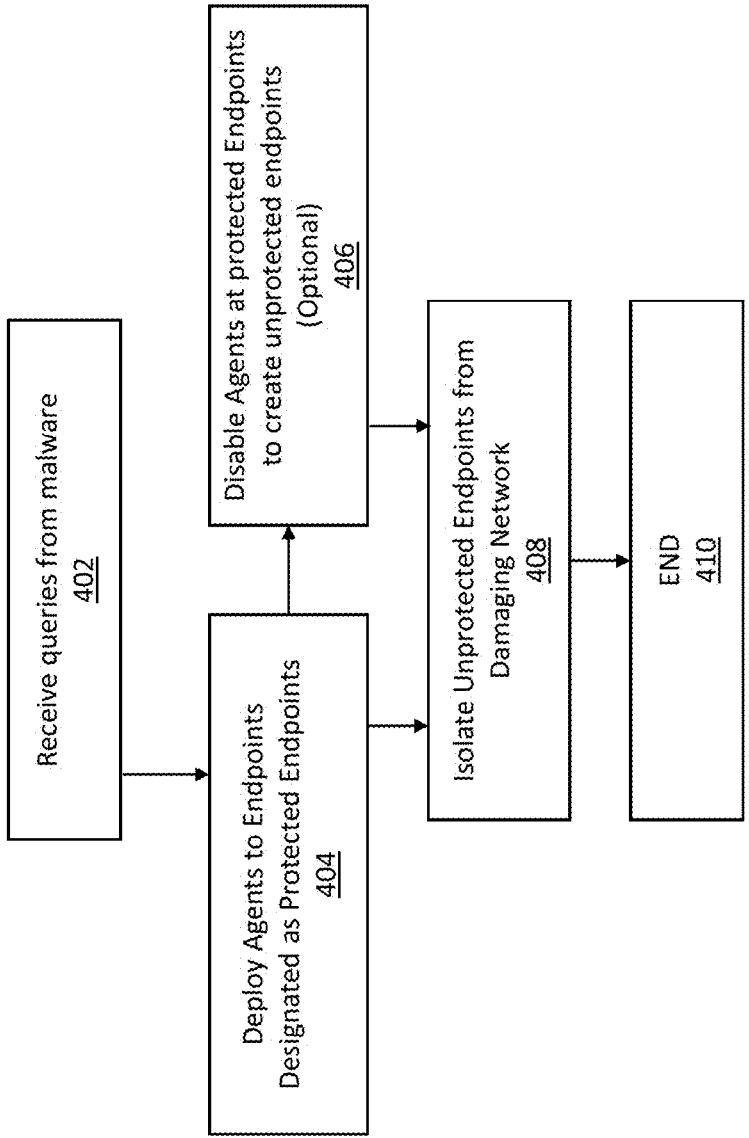

METHOD AND SYSTEM FOR HANDLING MALWARE

RELATED APPLICATIONS

This application is a National Phase of PCT Patent Application No. PCT/IL2014/050775 having International filing date of Aug. 27, 2014, which claims the benefit of priority under 35 USC =119 (e) of U.S. Provisional Patent Application Ser. No. 61/870,271 filed on Aug. 27, 2013. The contents of the above applications are all incorporated by reference as if full set forth herein in their entirety.

TECHNICAL FIELD

The present invention is directed to preventing malware attacks on networks.

BACKGROUND

"Malware" is short for "malicious software"—computer programs designed to infiltrate and damage computers without the user's consent. Malware is an exponentially growing threat with hundreds of thousands of new instances reported weekly. One of the reasons is that packer technology, which involves wrapping existing malware and encrypting the malware to disguise the contents of the malicious files, gives the malware the ability to multiply into different samples. This results in potentially thousands of different malware variations, in which underneath is the same malware. This is shown, for example, in FIG. 1, where a single malware 1a, 1b and 1c, has multiplied, for example, via packer technology, into numerous variations 2a, 2b, 2c.

Advanced Persistent Threat (APT) attacks, which include malware, are another type of threat faced by networks of organizations and enterprises. Other advanced malwares are used to access or extract data from a specific network resource in a specific organization. This network resource may be, for example, a privileged or a sensitive server, or a control system for an industrial machine—e.g., supervisory control and data acquisition (SCADA).

Contemporary security products, including cyber security prevention products, handle attacks, such as APT, cyber, advanced malware and targeted attacks, by analyzing signatures. This analysis involves comparisons of signatures of known threats, for example, memory signatures, file system signatures, network signatures or other type of signatures. Other comparisons of known threats are done by comparing reputations of threats, such as by behavior analysis.

Other security/cyber security products supply behavior forensic ability in real time or after an incident. These products are typically implemented at a network level or on endpoints (agent based solutions). Some vendors are combining these two abilities.

However, most of these contemporary security systems take same general approach in their attempt to prevent malware attacks. The malware is first detected and then analyzed, with subsequent preventative action.

Still, security systems can not guarantee absolute protection from malware, APTs (Advanced Persistent Threats) and targeted attacks. This is because most of the common malware uses a set of evasion techniques to avoid and prevent accurate analysis of the malware for detection. These evasion techniques prevent security-analysis software detecting the malware and analyzing its origin, for example, in a virtualized environment, commonly referred to as a 'Sandbox'. Other malware uses evasion techniques to detect the presence of security software, and once detected, refrain from execution at the endpoint with the security software, to avoid detection by it.

Reference is now made to FIG. 2 and FIG. 3, which detail an example of an evasion technique used by advanced malware. FIG. 2 shows a typical internal network 20, for example, of an enterprise, also known as an "enterprise network," which is linked to an external network 10. The external network 10 is, for example, a wide area or public network, such as the Internet.

The internal network 20 includes, for example, a DMZ (demilitarized zone) area 21 and a secondary area 22. The DMZ area 21, typically includes gateways, security systems, such as "sandboxes," next generation IPS, represented by the endpoint 24. The DMZ area 21 is a semi-secure segment of the internal or enterprise network 20. A DMZ area is typically used to provide to outside users access to corporate resources, because these users are not allowed to reach inside servers directly, these inside machines, defining the endpoints 26. The secondary area 22 of the internal network 20, includes endpoints 26. Typical endpoints include networked user computers, and other computer type devices.

In a typical network, the DMZ area 21 acts as a gateway to the internal network 20, in order to detect malware, as the malware attempts to penetrate the enterprise or internal network 20.

Since targeted attacks mostly aim to be able to extract information and/or persistently control resources at the victim environment/network, targeted attacks use advanced malware with persistent and evasion techniques as described above. This malware usually attempts to distribute itself to other network resources, such as servers and workstations over the network of an enterprise, until it reaches a less protected endpoint 26, assumed to be beyond the DMZ Area 21, i.e., within the secondary area 22 of the internal network 20, thus, bypassing the enterprise's security protection mechanisms in the DMZ area 21. After bypassing the enterprise's security protection mechanisms and 'finding' a less secured victim machine or network environment, the malware then executes the attack and spreads mutant variations over the internal network 20. The malware has now become a persistent threat or APT, which can significantly damage the enterprise's network and machines thereon.

For example, targeted attacks use advanced malware with evasion techniques, which are able to detect security systems (such as sandbox). Upon detection, the malware refrains from executing, in order to avoid being detected by the security system.

FIG. 3 shows a process of a malware attack, for example, on the internal network 20. The malware reaches the internal network 20 via the external network 10. The malware arrives in the DMZ area 21, at the gateway of an enterprise or internal network 20, represented by the endpoint 24, at block 30. Also at block 30, the malware then identifies the presence of the security system, for example, a Sandbox machine, also represented by the endpoint 24. Moving to block 31, the malware executes non-suspicious code that attempts to detect the presence of security systems' common behavior. This common behavior includes, for example, the existence of Virtual Machine (VM) processes/services, which are common behaviors of Sandbox technology, that use multiple virtual machines to run file analysis in an isolated environment looking for suspicious behavior (anomaly).

If the malware detects such process/service, the process moves to block 32, as a security environment has been detected. The process then moves to block 33, where the malware refrains from execution to avoid detection and waits until it gets to its next-hop, e.g., the next network node, for example, an endpoint 26 in the secondary area 22, or alternately, destroys itself (self destruction). This self destruction typically happens when malware injected to the endpoint 26, was not applied from the external network, but from physical access to the endpoint via removable media, the access having be obtained using social engineering. In this case, the process is over, as the malware self destructed. Should the malware have moved to its next network hop, the process returns to block 31, from where it resumes.

From block 31, should the malware not have detected a security process/service, the process moves to block 34, where the malware continues to look for a potential target. With a target found, the malware executes, at block 35. Most of the 'deadliest' targeted malware attacks use this described attack concept of FIG. 3.

SUMMARY OF THE INVENTION

The present invention is directed to systems that prevent malware attacks, by manipulating the malware itself. This is known a "prevention by manipulation" or "prevention without detection." The manipulation is performed, for example, by creating simulated environments in the endpoints of internal networks, these simulated environments being like that or similar to the environments of other endpoints, where it is known that the malware will refrain from executing, thus, preventing the malware from damaging the network and the machines thereon. Such simulated environments include those of security systems.

When malware reaches these internal network endpoints, and determines the environment to be one where it does not execute, for example, an environment, similar or identical to that of the security system's endpoint, the malware refrains from executing, and therefore, does not attack the system. This is known as "prevention without detection" or "prevention by manipulation," as the simulated environment causes the malware itself to refrain from executing, without the malware actually having to be detected.

This simulated environment is also applied to disguise specific machines with simulated environments of different machines, which are known to cause malware to refrain from executing, and damaging the machine. Similarly, this simulated environment is also known to disguise machines with certain operating systems, hardware, or running specific software, with simulated environments of different operating systems, hardware, or running specific software, which are known to cause malware to refrain from executing, and damaging the machine, the operating system, the hardware or software of the machine.

The present invention provides systems, methods, and software products, which prevent malware attacks on networks, which include endpoints. These systems, methods and software products provide an environment to the endpoint which simulates an environment, for example, a security environment, where malware is known to refrain from executing.

The present invention operates such that when malware reaches internal network endpoints, and the malware determines that the present environment, which is similar or identical to that of the security system's endpoint, the malware refrains from, and does not, execute. Additionally, the present invention prevents malware attacks without having to detect the presence of malware. This is different from contemporary security systems, which actually detect malware by detecting elements of the malware, such as signatures, or by methods such as behavior detection.

The present invention includes downloadable software and other software products including non-transitory computer-readable storage media, which include modules with computer-usable program code (code) defining an agent. The agent is used to provide a simulated environment, such as a simulated security system environment, simulated machine or system, to an endpoint of an internal network, the simulated environment, simulated machine or simulated system corresponding to environments, machines or systems where it is known that malware refrains from executing.

Embodiments of the present invention provide simulated environments, since malware attempts to recognize its environment. These simulated environments are designed to simulate actual environments which malware is known to refrain from executing in. The simulated environments are, for example, in the form of agents, which include modules. The agents sit on the operating system of an endpoint (a machine defines the endpoint) in order to provide the specific simulated environment to the machine with the operating system, such as an internal or enterprise network.

Embodiments of the present invention are directed to a computer-implemented method for preventing malware from attacking a network at an endpoint. The method comprises: providing an environment to the endpoint, the environment simulating an environment where malware refrains from executing.

Optionally, the environment provided to the endpoint includes an agent that simulates the environment where malware refrains from executing.

Optionally, the endpoint includes a computer.

Optionally, the agent functions as a proxy for the environment being simulated in the actual environment of the computer of the endpoint.

Optionally, the method additionally comprises disguising the agent from detection by malware.

Optionally, the method additionally comprises: changing the environment simulating an environment where malware refrains from executing over a predetermined time period.

Optionally, the environment simulating an environment where malware refrains from executing includes a security system.

Optionally, the environment simulating an environment where malware refrains from executing includes at least one of: a computer, hardware on a computer, and software running on a computer.

Optionally, the method additionally comprises: reporting queries made by malware to the computer at the endpoint to third party agents (TPAs) including Network TPAs and Endpoint TPAs.

Optionally, the method additionally comprises: reporting queries made by malware to the computer at the endpoint to a management server on the network.

Optionally, the agent sits between two abstraction layers associated with the computer at the endpoint.

Other embodiments of the present invention are directed to computer program products stored on a non-transitory tangible computer readable storage medium for preventing malware from attacking a network at an endpoint. The computer program products comprise: computer usable program code for providing an environment to the endpoint, the environment simulating an environment where malware refrains from executing.

Optionally, the computer program products additionally comprise computer usable program code which includes an agent comprising computer usable program code for simulating the environment provided to the endpoint includes an agent that simulates the environment where malware refrains from executing.

Optionally, the endpoint includes a computer.

Optionally, the agent includes computer usable program code for operating as a proxy for the environment being simulated in the actual environment of the computer of the endpoint.

Optionally, the agent includes computer usable program code for disguising the agent from detection by malware.

Optionally, the agent includes computer usable program code for changing the environment simulating an environment where malware refrains from executing over a predetermined time period.

Optionally, the environment simulating an environment where malware refrains from executing includes a security system.

Optionally, the environment simulating an environment where malware refrains from executing includes one of: a computer, hardware on a computer, and software running on a computer.

Optionally, the agent includes computer usable program code for reporting queries made by malware to the computer at the endpoint to third party agents (TPAs) including Network TPAs and Endpoint TPAs.

Optionally, the agent includes computer usable program code for reporting queries made by malware to the computer at the endpoint to a management server on the network.

Other embodiments of the present invention are directed to computer program products stored on a non-transitory tangible computer readable storage medium for preventing malware from attacking a network at an endpoint, which comprise an agent. The agent operates on a computer associated with the endpoint. The agent includes modules for storing instructions in computer usable program code, the instructions executable by a processor of the computer, and the instructions for providing an environment to the endpoint, the environment simulating an environment where malware refrains from executing.

Optionally, the agent includes a module, for example, a prevention module, for storing instructions in computer usable program code for operating as a proxy for the environment being simulated in the actual environment of the computer associated with the endpoint.

Optionally, the agent includes a module, for example, a cloaking module, for storing instructions in computer usable program code for disguising the agent from detection by malware.

Optionally, the agent includes a module, for example, a configuration module, for storing instructions, including for example, rules and policies, in computer usable program code for changing the environment simulating an environment where malware refrains from executing over a predetermined time period.

Optionally, the environment simulating an environment where malware refrains from executing includes a security system.

Optionally, the environment simulating an environment where malware refrains from executing includes at least one of: a computer, hardware on a computer, and software running on a computer.

Optionally, the agent includes a module, for example, a reporting module, for storing instructions in computer usable program code for reporting queries made by malware to the computer associated with the endpoint to third party agents (TPAs) including Network TPAs and Endpoint TPAs.

Optionally, the agent includes a module, for example, a reporting module, for storing instructions in computer usable program code for reporting queries made by malware to the computer associated with the endpoint to a management server on the network.

Other embodiments of the present invention are directed to a method for increasing detection of malware. The method comprises: reporting malware queries to a third party agent (TPA) installed on a computer; and, causing the third party agent to perform additional analysis procedures on suspected malware, resulting from the reporting of the malware queries.

Optionally, the method additionally comprises: causing the third party agent to perform additional analysis of non-running code of the suspected malware, resulting from the reporting of the malware queries.

Optionally, the reporting malware queries includes reporting suspicious code within the malware queries.

Optionally, the third party agent includes network third party agents and endpoint third party agents.

Other embodiments of the present invention are directed to a method for directing malware to at least one designated endpoint in a network, the network including a plurality of endpoints. The method comprises: designating the endpoints to be protected and the at least one endpoint to be unprotected; deploying agents to endpoints designated as protected endpoints; and, isolating the at least one endpoint designated to be unprotected to prevent damage to the network from executing malware.

Optionally, the method additionally comprises: disabling agents at protected endpoints in response to designating the at least one endpoint to be unprotected.

Optionally, the designating the endpoints to be protected includes determining that the endpoints are associated with an operative agent.

Optionally, the designating the endpoints to be protected includes determining that the endpoints are associated with an enabled agent.

Optionally, the isolating the at least one endpoint designated to be unprotected includes quarantining the at least one endpoint designated to be unprotected.

Embodiments of the present invention are directed to computer program products stored on a non-transitory tangible computer readable storage medium for directing malware to at least one designated endpoint in a network, the network including a plurality of endpoints. The computer program products comprise: at least one module, for example, a malware navigation module (MNM) for operation on a computer associated with the endpoint, the at least one module for storing instructions in computer usable program code. The instructions are executable by a processor of the computer, and the instructions are for: designating the endpoints to be protected and the at least one endpoint to be unprotected; deploying agents to endpoints designated as protected endpoints; and, isolating the at least one endpoint designated to be unprotected to prevent damage to the network from executing malware.

Optionally, the instructions additionally comprise: disabling agents at protected endpoints in response to designating the at least one endpoint to be unprotected.

Optionally, the designating the endpoints to be protected includes determining that the endpoints are associated with an operative agent.

Optionally, the designating the endpoints to be protected includes determining that the endpoints are associated with an enabled agent.

Optionally, the isolating the at least one endpoint designated to be unprotected includes quarantining the at least one endpoint designated to be unprotected.

Throughout this document "servers" include machines such as computers ("machines" and "computers" are used interchangeably herein) and computing or computer systems (for example, physically separate locations or devices), computer and computerized devices, processors, processing systems, computing cores (for example, shared devices), and similar systems, modules and combinations of the aforementioned. A "server" is typically a remote computer or remote computer system, or computer program therein, that is accessible over a communications medium, such as a communications network including the Internet, that provides services to other computer programs (and their users), in the same or other computers. A server may also include a virtual machine, a software based emulation of a computer.

The machines, computers, servers, and the like, which are associated with the endpoints, on which the present invention is performed, include, for example, operating systems (OS), one or more processors, and storage/memory. The processors execute machine executable instructions associated with performing the present invention as detailed herein. The storage/memory, for example, stores machine executable instructions associated with the operation of the components of the respective machine, computer, or server.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 6 is a diagram of an agent in accordance with embodiments of the present invention;

FIG. 7 is a segment of program code including queries by malware;

DETAILED DESCRIPTION OF THE DRAWINGS

Figure 1:
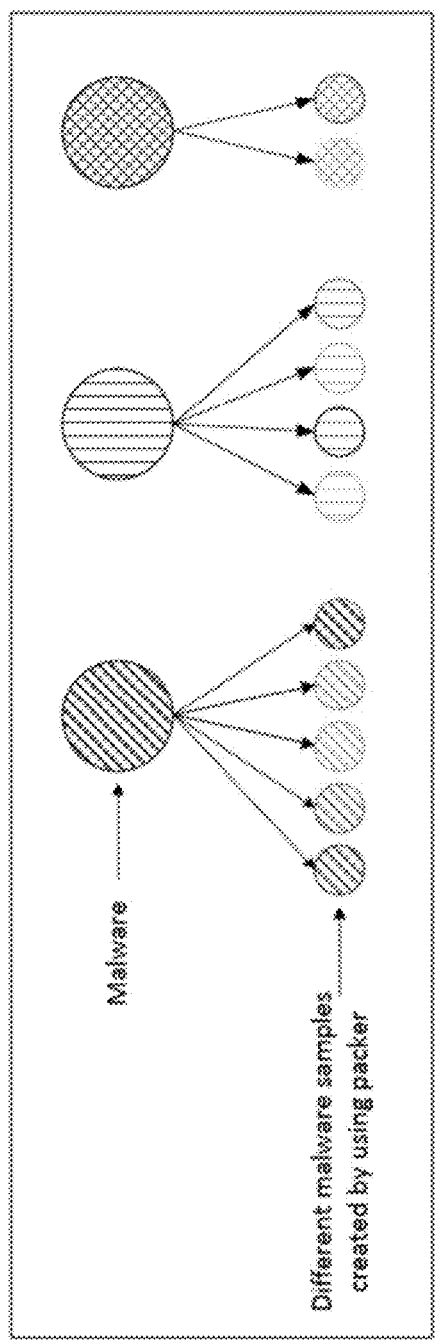
FIG. 1 is a diagram of malware and its variations.
Figure 2:
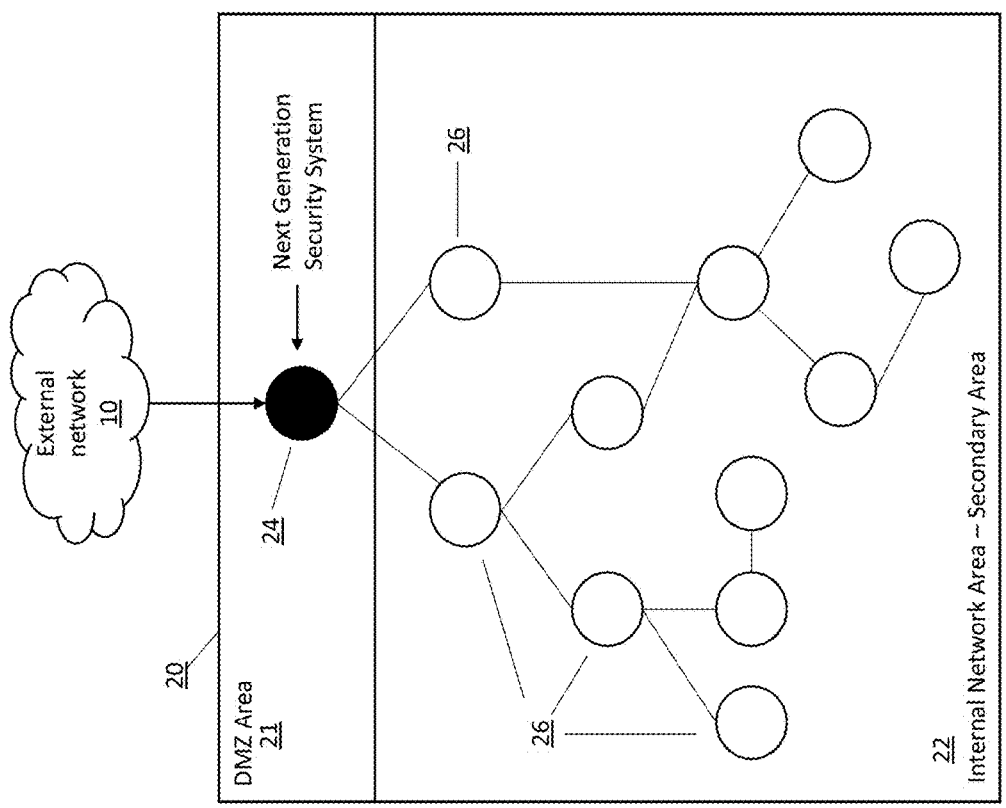
FIG. 2 is a diagram of a network architecture used in describing an example malware attack.
Figure 3:
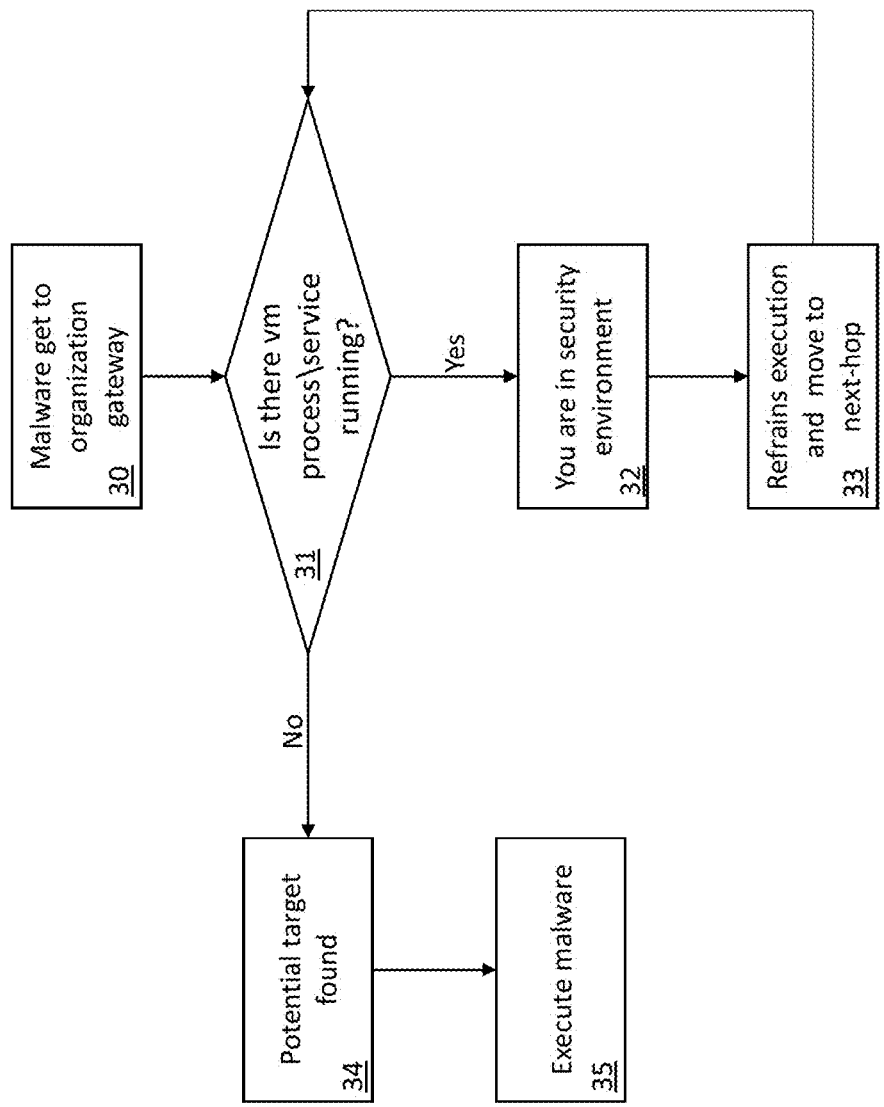
FIG. 3 is a flow diagram detailing a process of a malware attack, such as that on the internal network of the diagram of FIG. 2.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Figure 4:
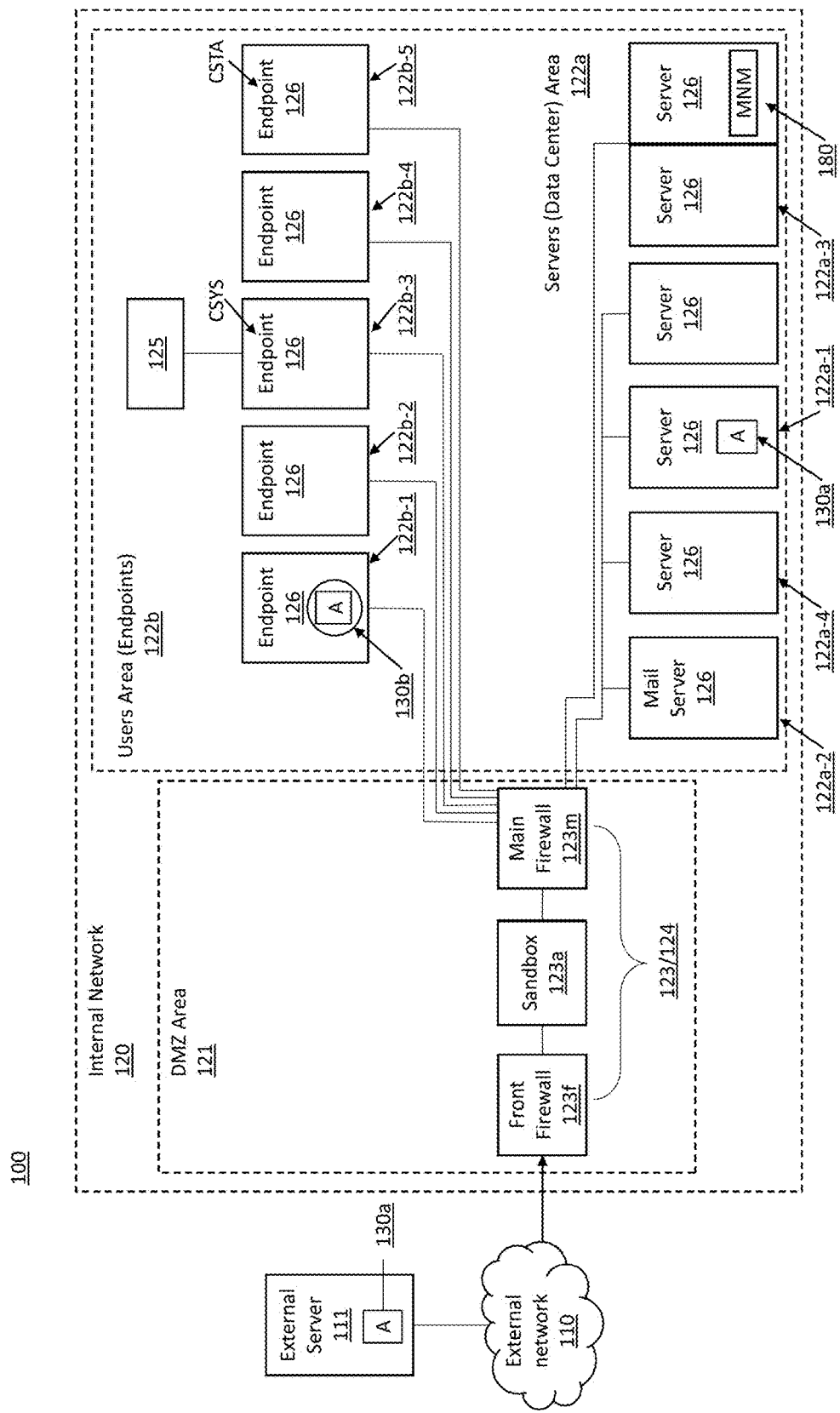
FIG. 4 is a diagram of an exemplary environment including an embodiment of a security system in accordance with an embodiment of the invention.

Attention is now directed to FIG. 4, which shows an exemplary environment 100 in which the present invention operates. The environment 100 is divided into an External Network 110 and an Enterprise or Internal Network 120. The External Network 110 is, for example, a wide area or public network, such as the Internet. An external server 111 links to the external network 110, and is representative of all servers along the external network 110.

The internal network 120 includes a DMZ area 121 and a secondary area 122. Within the DMZ area 122 is a security system 123, formed, for example, of a "sandbox" 123a, a front firewall 123f and a main firewall 123m. The security system 123 defines an endpoint 124. The secondary area 122 includes, for example, a data center area 122a and a user area 122b. The data center area 122a may include various servers, such as security servers 122a-1, mail servers 122a-2, a management server 122a-3, a control server 122a-4, and the like, while the user area 122b, for example, includes user computers 122b-1. For example, one of the computers 122b-1, serves as a control station (CSTA) for the other computers 122b-1. Also, for example, one of the computers 122b-1, designated CSYS, serves to control and be a control system for machines 125, such as industrial machines, for example, SCADA machines, printers, generators, and the like. These machines 125 are connected to the control station computer (CSYS) by a serial port or the like.

The management server 122a-3 distributes the agents 130 around the internal network 120, for example, within the secondary area 122. The management server 122a-3 determines the set of endpoints, which will act as a single point of configuration for the whole suggested system (for example, will be able to configure which security systems the Prevention Module 161 will simulate). The Management Server Interface module 163 will also be able to distribute (install) or to uninstall or disable the different modules for each agent 130. For example, by disabling the agent 130, the machine, formerly a protected endpoint, becomes an unprotected endpoint, as discussed in detail below with reference to FIGS. 10 and 11. The management server 122a-3 also optionally includes a Malware Navigation Module (MNM) 180, the operation of which is detailed below.

The aforementioned servers, including servers 122a-1 to 122a-4, and computers 122b-1 of the secondary area 122, are collectively and interchangeably referred to as "machines." All of the machines (including those 122a-1 to 122a-4, and 122b-1), in the secondary area 122, define endpoints 126.

Figure 8:
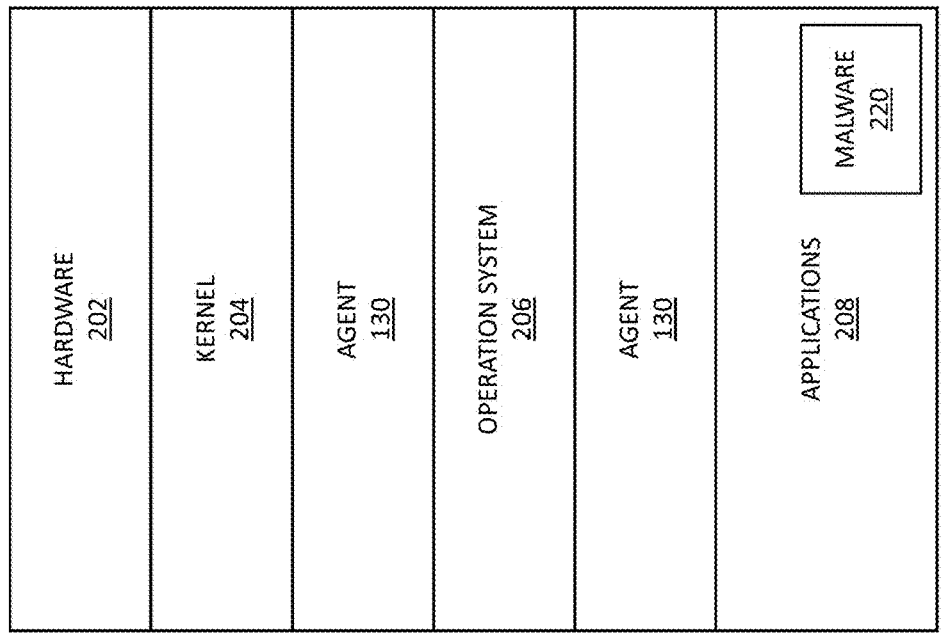
FIG. 8 is a diagram of computer abstraction layers including the agent in accordance with embodiments of the present invention, the agent as deployed in the layers.

The system operates by placement of an agent 130 onto an endpoint, such as endpoints 126 of the secondary area 122 of the internal network 120. The agent 130 is deployed to sit on the operating system (OS) of the machine (e.g., servers 122a-1 to 122a-4 and 122b-1) and inject its code into the computer abstraction layers 202, 204, 206, 208, as shown in FIG. 8 and detailed below. The agent 130, once installed at the endpoint 126, for example, by integrating into the operating system of code of the endpoint 126, provides the endpoint 126 with a virtual environment which mimics or simulates the designated environment, for example, the designated environment being the environment of the security system 123 (i.e., a security environment). With the agent 130 installed and active on the machine, the endpoint 126 corresponding to the machine is referred to as a protected endpoint.

The agent 130 is in numerous forms, such as downloadable format 130a, such as downloadable software or a downloadable application, which may be obtained from an external network server 111, or a server of the internal network 120, such as the security system server 122a-1. The agent 130 may also be on non-transitory storage media or other software products, for example, a compact disc 130b, or other computer-readable storage media.

Figure 5:
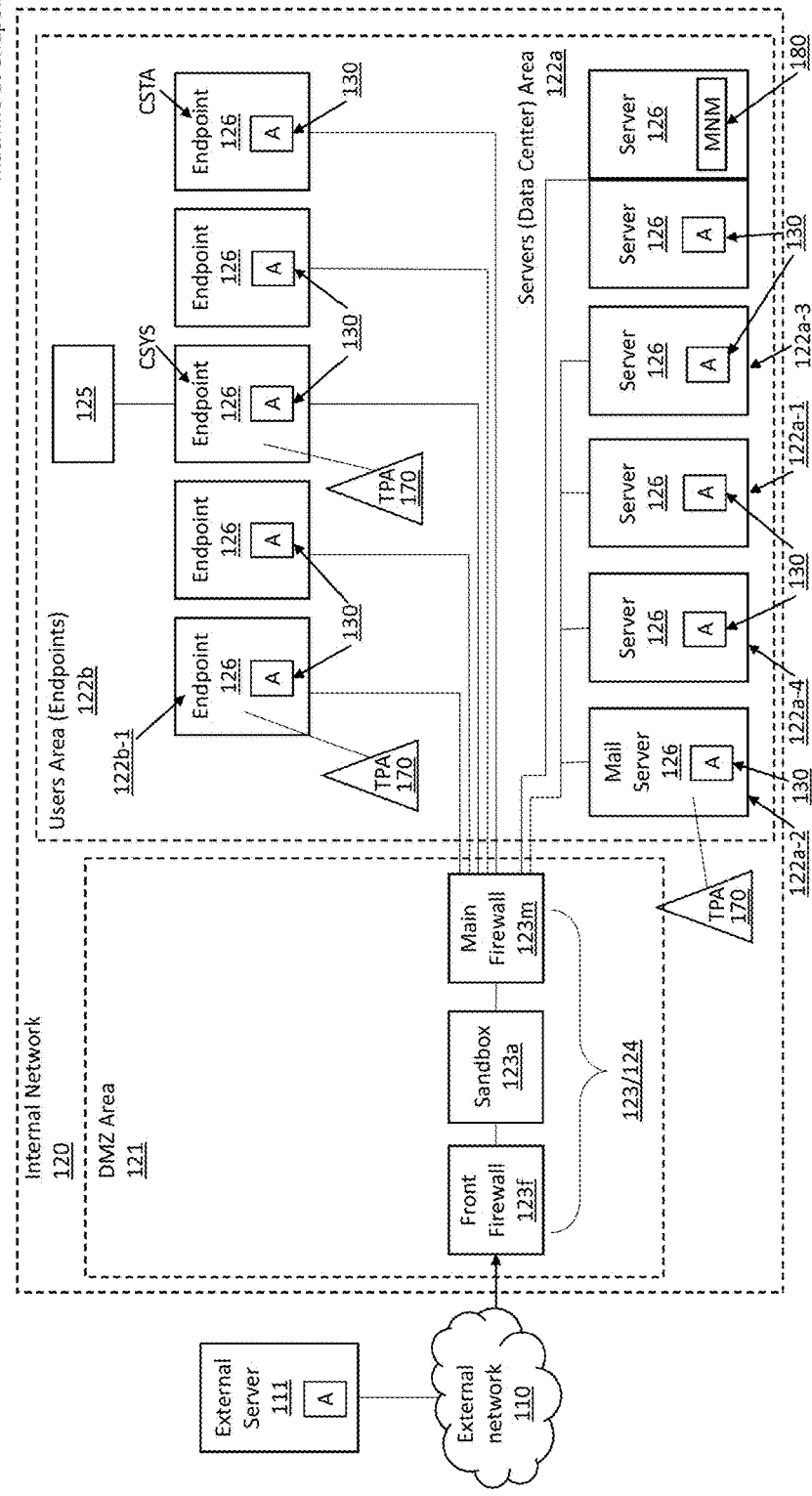
FIG. 5 is a diagram of an exemplary environment with agents in accordance with embodiments of the present invention sitting on all endpoints of an internal network portion.

FIG. 5 shows the secondary area 122 of the internal network 120 with agents 130 installed on all of the machines of the endpoints 126. The agents 130 may have been obtained by the machines of the endpoints 126 by any of the above downloads or storage media.

FIG. 6 shows the agent 130, for example, as downloadable software, an application or a software product 130a, 130b, or other non-transitory computer-readable storage media. The agent 130 includes modules 161-165, for integrating into the machines of the endpoints 126 of the internal network 120. The modules 161-165 include instructions, embodied in computer usable program code or code, for performing the processes of the specific module 161-165. The code, instructions and the like of the modules 161-165 is executed by one or more processors of the operating system (OS) in which the agent 130 embeds, as shown, for example, in FIG. 8. In FIG. 8, the agent 130 embeds in the operating system of the machine, for example, integrating into the code of the operating system, to simulate a computer system, or other system, for example, a security system for a computer system, of the security system endpoint 124.

When malware has reached this endpoint 126 with the agent 130 running thereon (on the operating system), the endpoint 126 with the agent running a simulated security system, is detected by the malware. The malware includes an evasion technique, which queries the endpoint 126, to determine its environment. For example, should a simulated security system environment be detected, coupled with the malware being programmed to refrain from executing in security system environments, the malware refrains from executing.

The prevention module 161 serves as a proxy, for the operating system. This module 161 is queried (one or more queries) by the malware, and responds to the queries by indicating the environment the agent is simulating, for example, a secured environment (i.e., a Sandbox or an environment with security systems, such as the actual security system 123 of the internal network 120). FIG. 7 shows exemplary code of malware including queries. These queries are made by the malware, as it attempts to detect a virtual machine environment in order to evade detection by a sandbox. For example, these exemplary queries are found in "Anti-Virtual Machine and Anti-Sandbox in Malware," Antiy Labs—The Next Generation, www(dot)antiy(dot)net (Four Pages), this document incorporated by reference herein.

This module 161 responds to queries by the malware by indicating, for example, that the malware has reached an operation port of a sandbox, various security hardware which is installed, and the existence of debugging, sniffing or other virus analyzing utilities, all aspects of security system environments. The prevention module 161 is programmable to simulate almost any kind of security system, via the configuration module 164, by manipulating the Operation System of the endpoint, such as endpoints 126, which includes servers, computers, computer devices, and the like. These endpoints 126, with the agent 130 installed thereon, present malware which reaches the respective endpoint 126 with a simulated, false or mimicked environment. For example, on Windows® based Operating Systems, the prevention module 161 simulates the existence of one or more processes, the existence of certain files, certain data, certain registry values, the existence of services, and status, specific network protocol responses, and the like, associated with a security environment, from which the malware is known to refrain from executing on.

Additionally, each security system, such as security system 123, has its own fingerprint, which is stored, for example, as a rule or policy in the management server 122a-3. The malware attacks or alternately, refrains from attacking, based on the fingerprint detected and identified. The prevention module 161 is programmed to simulate the corresponding security system on the endpoint(s) 126. When any of the aforementioned security system environments are created by the prevention module 161 and installed on the server, computer, computer device or the like of the endpoints 126, the malware detects a security environment, the malware refrains from execution. As a result, the malware fails to execute, since the malware attempts to avoid detection.

The cloaking module 162 hides or conceals the agent 130, and its existence, from the malware, when the agent 130 is installed on the machine of the endpoint 126. By hiding, cloaking or otherwise disguising the agent 130, the malware can not detect that an agent 130 is installed on the machine of the endpoint 126. As a result, malware is prevented from detecting that an agent is on the operating system of the machine at that endpoint 126. The cloaking module 162 includes an internal policy, which simulates a predetermined or preprogrammed environment, without the agent 130. The cloaking module 162 hides the agent 130, and its modules 161-165, by both periodically modifying the characteristics of the modules (i.e., renaming their process names, service names or related files, etc.). This process is known as dynamic simulation, and is detailed further below. The cloaking module 162 also manipulates the Operating System of the machine at the endpoint 126 that processes the query from the malware, such that the malware identifies the environment at the endpoint as a security environment.

The management server interface module 163 manages electronic and data communications with the management server 122a-3. This module 163 is programmed to, for example, notify the management server 122a-3 of an agent's status, obtain a list of policies it should employ, and notify the configuration module 164 of this data, and suspicious behaviors by the reporting module 165, which may indicate malware.

The configuration module 164 is programmable to determine the policies to be implemented on each agent 130. For example, this module 164 is programmable, such that a security manager or other algorithm, computer program or the like, determines the configuration or environment that the agent 130 should run. For example, should a security system be selected as the simulated environment for the agent 130, the configuration module 164 determines whether the configuration should be one or more of a firewall, antivirus, Intrusion Prevention System (IPS), and combinations thereof. The configuration may be determined in accordance with rules and policies stored in the module 164, as received from the management server 122a-4.

The configuration module 164 also defines different simulation policies, for example, for security environments, that will be used by the prevention module 161. Each simulation policy is such that it defines the methods to perform in order to simulate the existence of one or more security/cyber-security products. For example in order to simulate security product 'X', a set of files should be simulated to be existing on the file system, a set of processes/services should be simulated to be existing on the machine.

The reporting module 165 functions to report to the management server 122a-3 the identification of specific queries, such as those from malware, which are malicious, as detected and recorded (or stored) by the prevention module 161. This module 165 also alerts or reports to third party security systems, or third party agents (TPAs). TPAs are both network solutions, in the form of network security products (known as "network TPAs") and endpoint solutions, in the form of endpoint security products 170 (known as endpoint TPAs 170). Network TPAs include, for example, the organizational antivirus servers, e.g., the security server 122a-1, or on-line malware detection and analysis services, such as VirusTotal™ available at www(dot)VirusTotal(dot)com. These network TPAs may reside on an external server, such as server 111. Endpoint TPAs 170 are, for example, security system agents, such as anti-virus software, Host IPS, installed locally on machines of endpoints, and are shown in FIG. 5 as installed on machines 122a-2, 122b-1, on the respective endpoints 126. These TPAs also check for specific processes, queries, signatures, which could be from both known and previously unknown malware.

The reporting module 165 reports the malware queries, or code therein, to the TPAs as suspicious behaviors. Each TPA, upon detecting potential malware via such code, and which may normally perform a basic scan on a packer containing the malware, which may not detect the malware, will now perform a deep scan on the packer and detect the malware. Should malware be detected, the TPA will take protective action. Accordingly, the agent 130, via its modules 161-165, has now provided the TPAs, and accordingly, a computer, network or other endpoint system, with increased malware detection abilities. The TPAs can use this data of the received malware queries in their detection operations, to increase their likelihood of detecting malware, in real time, as soon as the data is received.

Endpoint TPAs 170 typically only check executing or running code, instead of all of the code for potential malware (e.g., malicious code indicative of malware), in order to minimize the impact on local machine performance at each endpoint 126. With notification from the reporting module 165, endpoints TPAs also check non-executing or non-running code for malware, as reported to the TPA. This reporting module 165 can perform the reporting in real time, or at various random times or at time intervals. This also increases the likelihood of detecting malware.

FIG. 8 shows the agent 130 as integrated into the computer abstract layers, hardware 202, kernel 204, Operating System (OS) 206, and applications 208. The agent 130 typically inserts itself between the kernel 204 and operating system 206 layers, and between the operating system 206 and application 208 layers. When the malware 220 arrives, at the endpoint 126 with the agent 130 sitting on the requisite machine, the malware 220 queries the applications layer 208.

Figure 9:
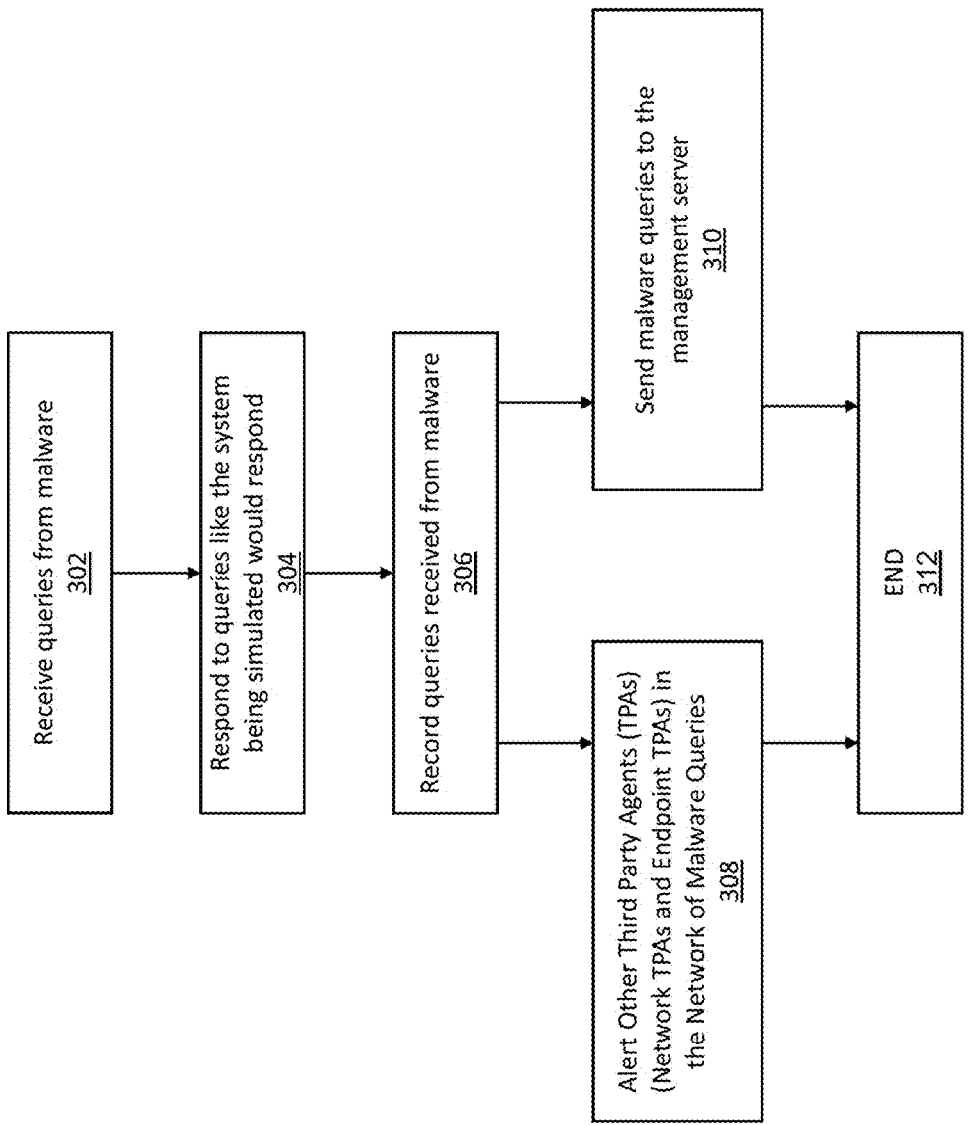
FIG. 9 is a flow diagram of a process in accordance with embodiments of the present invention.

Turning also to FIG. 9, exemplary implementations of computer implemented processes, including processes and/or subprocesses therein, performed by the agent 130, in accordance with embodiments of the disclosed subject matter, are now described. FIG. 9 shows an exemplary process for handling malware at an endpoint, such as endpoints 126 and preventing the malware from spreading throughout a network, such as the internal network 120. The aforementioned processes, including processes and/or subprocesses therein, are, for example, performed automatically and in real time.

Initially, at block 302, the malware 220 sits on the application layer 208, and attempts to communicate with the operating system layer 206 or the kernel layer 204. At block 304, the agent 130 then responds to the queries as if it is the actual system, which it is simulating, e.g., a security system. The received queries from the malware are reported by the reporting module 165 of the agent 130, at block 306. The reporting is to both the management server 122a-3 and TPAs, the TPAs 170 at the endpoints 126, and network TPAs.

The process then moves to blocks 308 and 310, which occur at approximately the same time, and may occur simultaneously. At block 308, the reporting module 165 alerts TPAs, both network TPAs and endpoint TPAs 170, of the malware queries. At block 310, the reporting module 165 sends the received malware queries to the management server 122a-3. Both the TPAs and the management server 122a-3 can update their database, caches or other storage media with malware queries, signatures, and the like, to better identify and detect malware. In the case of the TPAs, they can use this data of the received malware queries in their detection operations, to increase their likelihood of detecting malware, in real time, as soon as the data is received. From both of blocks 308 and 310, the process moves to block 312, where it ends. This process is performed on malware as many times as needed for as long as is necessary.

Figure 10:
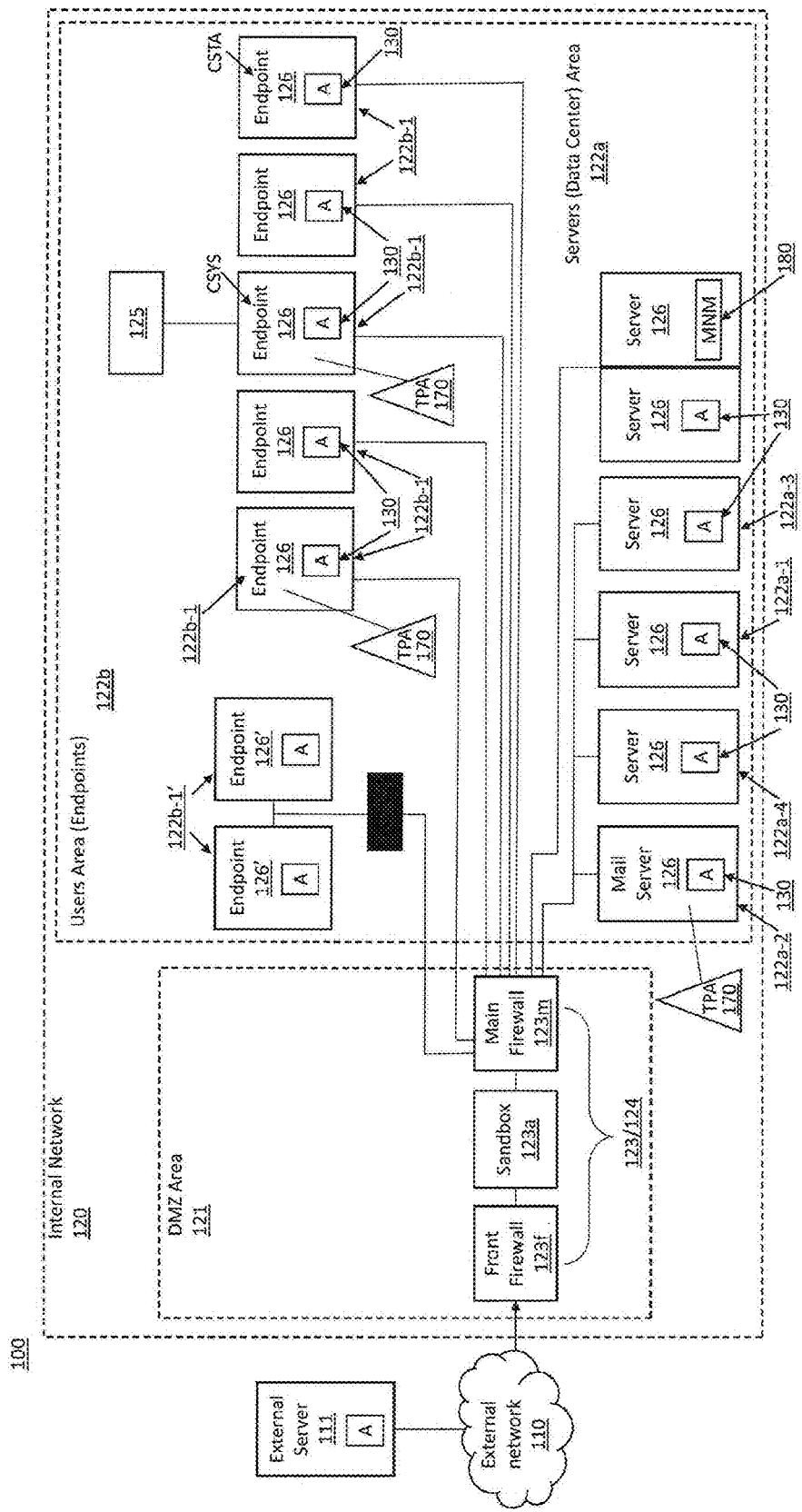
FIG. 10 is diagram detailing manipulation of malware in accordance with embodiments of the present invention; and, FIG. 11 is a flow diagram of another process in accordance with embodiments of the present invention.

Attention is now directed to FIG. 10. A Malware Navigation module (MNM) 180 is optional, and when operating with a machine in the internal network 120, such as the management server 122a-3, provides the machine with the ability to navigate malware within the internal network 120. This module 180 moves the malware around the internal network 122, for example, the secondary area 122b. In particular, the MNM module 180 allows the malware to move to endpoints 126', which are unprotected endpoints, in the secondary area 122b. These unprotected endpoints 126' do not have agents 130 sitting on the machines' 122b-1' operating system. Accordingly, the malware will only execute when reaching these designated endpoints 126'.

These intended or designated unprotected endpoints 126' may be, for example, a highly defended endpoints with malware forensics and file analyzer abilities. These endpoints 126' may also be quarantined, to further protect the internal network 122. Once the malware executes in the designated area, i.e., the endpoints 126', the forensics and file analyzer abilities, previously installed on these endpoints 126', can identify the malware (automatically or manually by a security professional that monitors those endpoints 126').

As an agent 130 was not installed on a machine at this endpoint 126', or alternately, an agent 130 was installed but the prevention module 161 was disabled (disabling the agent 130), the malware will only execute itself on these unprotected endpoints 126'. By having unprotected endpoints, such as endpoints 126', it is likely that malware will attempt to attack the relevant organization, via the internal network 120 at these endpoints 126'. This is because the malware is able to reach these endpoints 126' and can execute. Forensic security systems and other tools, are able to identify and analyze this malware. Without such unprotected endpoints 126', security professionals are forced to attempt to manually detect and analyze malware throughout the entire internal network 120. The malware navigation module (MNM) 180 can shift the unprotected endpoints to designated areas, to render endpoints as unprotected endpoints 126', dynamically, for example, upon application of a rule or policy or other automatic command.

Alternately, the management server 122a-3 is programmable, to move the agents 130 to the various endpoints 126, or disable agents 130 on machines, leaving some endpoints, such as endpoints 126' of FIG. 10, as designated endpoints for the malware. This designated endpoint 126' is without the agent 130, to allow for the malware to attack this endpoint 126'. The analytics installed on the machine, e.g., 122b-1' of the corresponding endpoints 126' operate in accordance with those for the endpoints 126' detailed above.

Turning also to FIG. 11, exemplary implementations of computer implemented processes, including processes and/or subprocesses therein, performed by the malware navigation module (MNM) 180 or other computer system, in accordance with embodiments of the disclosed subject matter, are now described. The aforementioned processes, including processes and/or subprocesses therein, are, for example, performed automatically and in real time. In this process, reference is also made to the environment of FIG. 10, as detailed above.

Initially, the MNM 180 or other computer system determines which endpoints in a network, for example, the internal network 120, in the secondary area 122 are to be protected and which endpoints are to be unprotected, at block 402. The process moves to block 404, where agents 130 are deployed to the protected endpoints 126 (FIG. 10). This deployment includes, for example, determining operable agents 130 associated with each endpoint designated to be a protected endpoint. The agents 130 may be, either previously installed, or sent for installation, on the machine associated with the designated endpoint for protection, over the network 120 as a result of the deployment, from, for example, the security server 122a-1, and are now installed on the machine associated with the endpoint to be protected. It is determined that the agents 130 are operative, and are enabled. Agents have not been deployed to, or installed at, designated unprotected endpoints 126' (FIG. 10) (i.e., the machines associated with these unprotected endpoints 126').

The process moves to optional block 406, where designated unprotected endpoints may be created from formerly protected endpoints. These now unprotected agents, for example, originate from previous installations of the agents 130, the agents 130 having been disabled on the respective machines.

From blocks 404 and 406, the process moves to block 408. At block 408, each unprotected endpoint 126' is isolated. This isolation includes, for example, being protected by quarantining or the like, to prevent the malware from damaging that endpoint 126' or spreading along the internal network 120 and damaging it as well as the machines thereon. The process ends at block 410.

With the process having ended, malware will hop between all of the endpoints 126, 126', but will only execute at the unprotected endpoints 126'. This execution of the malware is observable and recordable, along with any data associated with the malware and its execution, by forensics teams, network administrators, and other computers and security solutions.

Alternatively, the agent 130 can be used to prevent targeted attacks against an enterprise by disguising a highly sensitive endpoint. This sensitive endpoint may be, for example, a CEO's endpoint, which contains highly sensitive data, which may serve as a target for a malware attack. The agent 130 is configured with a specific policy on the CEO's endpoint, to disguise it as another endpoint, for example by mimicking a different hardware vendor, other usernames, other hard drive structure, or the like.

For example, a malware attacker may want to attack a specific machine in an enterprise, for example, a machine (CSYS) that controls a SCADA machine 125. The configuration module 164 will apply a rule or policy to the agent 130 on the specific machine which controls the SCADA machine, to simulate the environment of a different machine, thus, disguising the target machine, the machine which controls the SCADA machine.

Alternately, the agent 130 can be designed to simulate hardware on a machine different from the actual hardware used by the machine. This is also performed by the configuration module 164, by applying a rule or policy to create the simulated hardware environment of a different machine. When the prevention module 161 receives a query from the malware for the hardware used by the machine, vendor, type or version, the prevention module 161 will respond by mimicking a different result, than the natural one (the actual hardware, vendor, type or version) as instructed in the policy.

For example, a malware attacker may want to attack a specific machine, i.e., the target, which uses IBM® hardware. The configuration module 164 of the agent 130 applies a rule or policy to the specific machine, for example, the specific computer, which uses the IBM® hardware, to simulate different hardware, such as DELL® hardware for that of the machine. The malware attack is prevented because the target, the machine with the IBM® hardware, is not detectable by the malware.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and scope of the appended claims.

What is claimed is:

1. A computer-implemented method for preventing malware from attacking a network at an endpoint device, comprising:
    obtaining policy rules defining for each of a plurality of endpoints of a network whether said respective endpoint is designated as a protected endpoint or is designated as an unprotected endpoint;
    identifying at an endpoint device of said network, controlling a specific hardware component a query from a malware attempting to communicate with the endpoint device, the query querying which hardware component is controlled by the endpoint device;
    in response to an identification that said endpoint device is designated as protected, navigating said malware away from said endpoint, through said network, to another endpoint of said network designated as unprotected, by disguising said endpoint device by responding to said query with a response simulating a response of another endpoint device that does not control said specific hardware component;
    wherein said another endpoint designated as unprotected is isolated within the network to allow said malware to execute without damaging said network.

2. The computer-implemented method of claim 1, wherein the response is provided by an agent executed on the endpoint device and simulates an disguising environment which is different from an environment executed by the endpoint device, to cause a malware to refrain from executing.

3. The computer-implemented method of claim 2, wherein the endpoint device includes a processor.

4. The computer-implemented method of claim 2, wherein the agent simulates an environment disguising actual environment of the endpoint device.

5. The computer-implemented method of claim 2, wherein the agent is executed between two abstraction layers associated with the endpoint device.

6. The computer-implemented method of claim 1, wherein said specific hardware component is a supervisory control and data acquisition (SCADA) machine.

7. The computer-implemented method of claim 6, wherein the simulating is performed by at least one of mimicking a hardware vendor different from a hardware vendor of said endpoint and mimicking a username different than a username associated with said endpoint.

8. The computer-implemented method of claim 1, additionally comprising: reporting said query to at least one third party agent via a network.

9. The computer-implemented method of claim 1, additionally comprising: reporting said query to a management server via a network.

10. The computer-implemented method of claim 1, wherein said policy rules are defined for a predetermined time period.

11. The computer-implemented method of claim 1, wherein said definition for each of said plurality of endpoints is dynamically changeable.

12. The computer-implemented method of claim 1, wherein isolating said another endpoint designated as unprotected is by quarantining said another endpoint.

13. A computer program product for preventing malware from attacking a network at an endpoint device, the computer program product comprising:
    a non-transitory tangible computer readable storage medium storing program code wherein the program code is executed by a processor, the program code comprising:
    first computer usable program code stored on said non-transitory tangible computer readable storage medium for obtaining policy rules defining for each of a plurality of endpoints of a network whether said respective endpoint is designated as a protected endpoint or is designated as an unprotected endpoint;
    second computer usable program code stored on said non-transitory tangible computer readable storage medium for identifying at an endpoint device of said network, controlling a specific hardware component a query from malware attempting to communicate with the endpoint device, the query querying which hardware component is controlled by the endpoint device; and
    third computer usable program code stored on said non-transitory tangible computer readable storage medium for navigating said malware away from said endpoint, through said network, to another endpoint of said network designated as unprotected, in response to an identification that said endpoint device is designated as protected, by disguising said endpoint device by responding to said query with a response simulating a response of another endpoint device that does not control said specific hardware component;
    wherein said another endpoint designated as unprotected is isolated within the network to allow said malware to execute without damaging said network.

14. A system for preventing malware from attacking a network at an endpoint device, comprising:
    a memory adapted for storing an agent code;
    at least one processor coupled to the memory for executing said stored agent code, the agent code comprising:
    instructions for obtaining policy rules defining for each of a plurality of endpoints of a network whether said respective endpoint is designated as a protected endpoint or is designated as an unprotected endpoint;

instructions for identifying at an endpoint device of said network, controlling a specific hardware component a query from malware attempting to communicate with the endpoint device, the query querying which hardware component is controlled by the endpoint device; and instructions for navigating said malware away from said endpoint, through said network, to another endpoint of said network designated as unprotected, in response to an identification that said endpoint device is designated as protected, by disguising said endpoint device by responding to said query with a response simulating a response of another endpoint device that does not control said specific hardware component;

wherein said another endpoint designated as unprotected is isolated within the network to allow said malware to execute without damaging said network.

* * * * *